(12) United States Patent
Alekseev et al.

(10) Patent No.: US 10,690,698 B2
(45) Date of Patent: Jun. 23, 2020

(54) SCANNING PROBE MICROSCOPE COMBINED WITH A DEVICE FOR ACTING ON A PROBE AND A SPECIMEN

(71) Applicant: CHASTNOE UCHREZHDENIE "NAZARBAYEV UNIVERSITY RESEARCH AND INNOVATION SYSTEM", Astana (KZ)

(72) Inventors: Alexander Mihaylovich Alekseev, Astana (KZ); Aleksey Dmitrievich Volkov, Astana (KZ); Dmitry Yurjevich Sokolov, Moscow (RU); Anton Evgenievich Efimov, Moscow (RU)

(73) Assignee: Chastnoe Uchrezhdenie "Nazarbayev University Research and Innovation System", Astana (KZ)

( * ) Notice: Subject to any disclaimer, the term of this patent is extended or adjusted under 35 U.S.C. 154(b) by 73 days.

(21) Appl. No.: 16/302,132

(22) PCT Filed: May 18, 2017

(86) PCT No.: PCT/KZ2017/000010
§ 371 (c)(1),
(2) Date: Dec. 7, 2018

(87) PCT Pub. No.: WO2017/200363
PCT Pub. Date: Nov. 23, 2017

(65) Prior Publication Data
US 2019/0219609 A1 Jul. 18, 2019

(30) Foreign Application Priority Data
May 18, 2016 (KZ) .................................. 2016/0437

(51) Int. Cl.
*G01Q 30/20* (2010.01)
*G01Q 30/10* (2010.01)

(52) U.S. Cl.
CPC ............. *G01Q 30/20* (2013.01); *G01Q 30/10* (2013.01)

(58) Field of Classification Search
CPC . B82Y 35/00; G01N 1/06; G01N 1/42; G01Q 10/00; G01Q 30/00; G01Q 30/20
See application file for complete search history.

(56) References Cited

U.S. PATENT DOCUMENTS 5,299,481 A * 4/1994 Lihl ......................... F25D 3/10
 62/320
2012/0223228 A1 9/2012 Galloway
2017/0350921 A1* 12/2017 Alekseev ............... G01Q 30/20

FOREIGN PATENT DOCUMENTS

EP 2482080 8/2012
RU 2282257 8/2006
(Continued)

OTHER PUBLICATIONS

International Search Report PCT/KZ2017/000010 2 pages.
Written Opinion of the International Searching Authority PCT/KZ2017/000010 4 pages.

*Primary Examiner* — David E Smith
*Assistant Examiner* — Hsien C Tsai
(74) *Attorney, Agent, or Firm* — The Roy Gross Law Firm, LLC; Roy Gross

(57) ABSTRACT

A scanning probe microscope combined with a device for acting on a probe and a specimen relates to measurement technology, more specifically to devices for measuring objects by probe methods after nano-sectioning. Same can be used for studying the structures of biological and polymeric specimens under low-temperature conditions. The aim of the invention is to raise the operating efficiency of (Continued)

elements of the measurement unit of a scanning probe microscope which is combined with a device for acting on a probe and a specimen. The technical result of the invention consists in raising the resolution of the device and the quality of the image, as well as expanding the functional capabilities of the device by examining a broader range of specimens.

20 Claims, 4 Drawing Sheets

(56) References Cited

FOREIGN PATENT DOCUMENTS

| | | |
|---|---|---|
| RU | 2008130494 | 2/2010 |
| RU | 2012102492 | 3/2014 |

* cited by examiner

SCANNING PROBE MICROSCOPE COMBINED WITH A DEVICE FOR ACTING ON A PROBE AND A SPECIMEN

RELATED APPLICATIONS

This application is a National Phase of PCT Patent Application No. PCT/KZ2017/000010 having International filing date of May 18, 2017, which claims the benefit of priority of Kazakhstan Application No. 2016/0437.1 filed on May 18, 2016. The contents of the above applications are all incorporated by reference as if fully set forth herein in their entirety.

A scanning probe microscope combined with a device for acting on a probe and sample relates to measurement technology, or more specifically to measurement devices using probe methods of samples after nanocutting. It can be used for studying the structures of biological and polymeric samples at low temperatures.

A scanning probe microscope is known that is combined with a device for modifying an object surface, comprising a base having mounted thereon a punch module with a punch, including a first cutting edge and a first surface abutting thereon, the punch module including a first drive along a first coordinate X and a second drive along a second coordinate Y, also comprising a platform which is mounted on the base with the capability of moving in the direction of a third coordinate Z, and is coupled to a third drive along a third coordinate Z perpendicular to the coordinate plane XY, also comprising a piezo scanner which provides movement along the X, Y, Z coordinates, with a holder mounted thereon, an object carrier with object, the piezo scanner being secured on the platform, while the punch is arranged with the capability of interacting with the object, also comprising a probe unit with probe holder, in which a probe is secured, the probe unit being mounted on a base with the capability of moving along a first coordinate X and coupled to a fourth drive along the first coordinate X, the probe having the capability of interacting with the object [Patent RU2389032].

The disadvantage of this device lies in the fact that the piezo scanner with object is secured on a platform which is movably mounted on the base, while the probe unit with probe is also mounted on the base. In this case there is a long mechanical "loop" between the object and the probe: piezo scanner-platform-base-probe unit. This leads to an increase in the level of mechanical noise and increases the error of probe measurements.

Also known is a scanning probe microscope combined with a device for modifying a sample surface comprising a base on which a punch module with a punch is mounted, which includes a first cutting edge, the punch module including a first drive 6 which provides for the movement of the punch along a first coordinate X, and a second drive, which provides for the movement of the punch along a second coordinate Y, the first cutting edge being disposed along the second coordinate Y, also comprising a lever which is mounted on a base with the capability of moving in the direction of the third coordinate Z and is coupled to the pusher of the third driver, which provides movement of the lever along the third coordinate Z, also comprising a measurement unit which is secured on the lever and consists of a set of structural elements including a platform, a piezo scanner with holder, on which is mounted a sample carrier with a sample having a surface to be measured and also including a probe unit with probe holder in which the probe is secured, in this case the first cutting edge of the punch directs its blade at the sample in the direction of the third coordinate Z and is disposed with the capability of interacting with the sample by moving it along the coordinate Z with the lever, the piezo scanner is secured on the platform and provides scanning of the sample in the X, Y, Z coordinates, the probe unit is mounted on the platform and coupled to a fourth drive which provides movement of the probe unit along a first coordinate X, said probe having the capability of interacting with the sample surface to be measured during its scanning along the coordinates X, Y, Z. Application [EP2482080].

This device resolves the problem of reducing the mechanical "loop." This device is selected as the prototype of the proposed solution. Its basic disadvantages lie in the fact that it lacks the means of operational action on the probe and sample. This leads to a reduction in resolution and quality of the image.

The object of the invention is to raise the functional effectiveness of the elements of the measurement unit of the scanning probe microscope combined with a device for acting on the probe and sample.

The technical effect of the invention is to raise the resolution of the device and quality of the image, as well as to broaden the functional capabilities of the scanning probe microscope combined with a device for acting on a probe and sample by investigating a wider range of samples.

This technical effect is achieved in that a mechanical action module, which is secured on the punch module and has the capability of interacting with at least one of the structural elements of the measurement unit, in included in a scanning probe microscope combined with a device for acting on a probe and sample, comprising a base on which is mounted a punch module with a punch which includes a first cutting edge, the punch module including a first drive 6 which provides for the movement of the punch along a first coordinate X, and the second drive providing for the movement of the punch along a second coordinate Y, while the first cutting edge is disposed along the second coordinate Y and also comprises a lever which is mounted on the base, with the capability of movement in the direction of the third coordinate Z and is coupled to a pusher of the third drive, which provides movement of the lever along the third coordinate Z, and also comprising a measurement unit which is secured on the lever and consists of a set of structural elements, including a platform, a piezo scanner with holder, on which is mounted a sample carrier with sample which has the surface to be measured, and also includes a probe unit with probe holder in which a probe is secured, the first cutting edge of the punch directing its blade at the sample in the direction of the third coordinate Z, and is disposed with the capability of interacting with the sample by moving it along the coordinate Z with the lever, the piezo scanner being secured on the platform and providing scanning of the sample in the X, Y, Z coordinates, the probe unit being mounted on the platform and coupled to a fourth drive which provides movement of the probe unit along a first coordinate X, while the probe has the capability of interacting with the sample surface to be measured during its scanning along the X, Y, Z coordinates.

In one of the variants a mechanical action module is mounted with the capability of interacting with a platform.

In one of the variants the mechanical action module is mounted with the capability of interacting with a probe.

In one of the variants a probe holder is mounted with the capability of moving relative to the probe unit, while a mechanical action module is mounted with the capability of interacting with and moving the probe holder.

In one of the variants a mechanical action module is mounted with the capability of interacting with a sample.

In one of the variants a sample carrier is mounted with the capability of moving relative to the sample holder, and the mechanical action module is mounted with the capability of interacting with and moving the sample carrier.

In one of the variants a mechanical action module includes a heating unit and/or a piezo module.

In one of the variants a mechanical action module includes a second cutting edge which is disposed along a second coordinate Y which directs its blade at the sample surface to be measured in the direction of the first coordinate X.

In one of the variants a mechanical action module includes a needle that is disposed along the first coordinate X and directs its point at the sample surface to be measured in the direction of the first coordinate X.

In one of the variants a fourth drive is mounted on the base.

In one of the variants a gas action module is included which is mounted on a punch module, has the capability of coupling to a probe, or with a first cutting edge of a punch, or with a second cutting edge of a mechanical action module, or with the point of a needle, or with a sample surface to be measured.

In one of the variants a laser action module is incorporated in the device; it is mounted on a punch module and has the capability of being coupled to a first cutting edge of the punch, or with a second cutting edge of a mechanical action module, or with the point of a needle, or with a sample surface to be measured, or with a probe.

In one of the variants an ultraviolet action module is incorporated in the device; it is mounted on a punch module and has the capability of being coupled to a first cutting edge of the punch, or with a second cutting edge of a mechanical action module, or with the point of a needle, or with a sample surface to be measured, or with a probe.

In one of the variants a first plasma action module is incorporated in the device; it is mounted on a punch module and has the capability of being coupled to a first cutting edge of the punch.

In one of the variants a second plasma action module is incorporated in the device; it is mounted on a punch module which the capability of being coupled to the sample surface to be measured or with the second cutting edge of the mechanical action module, or with a needle point, or with a probe.

Figure 1:
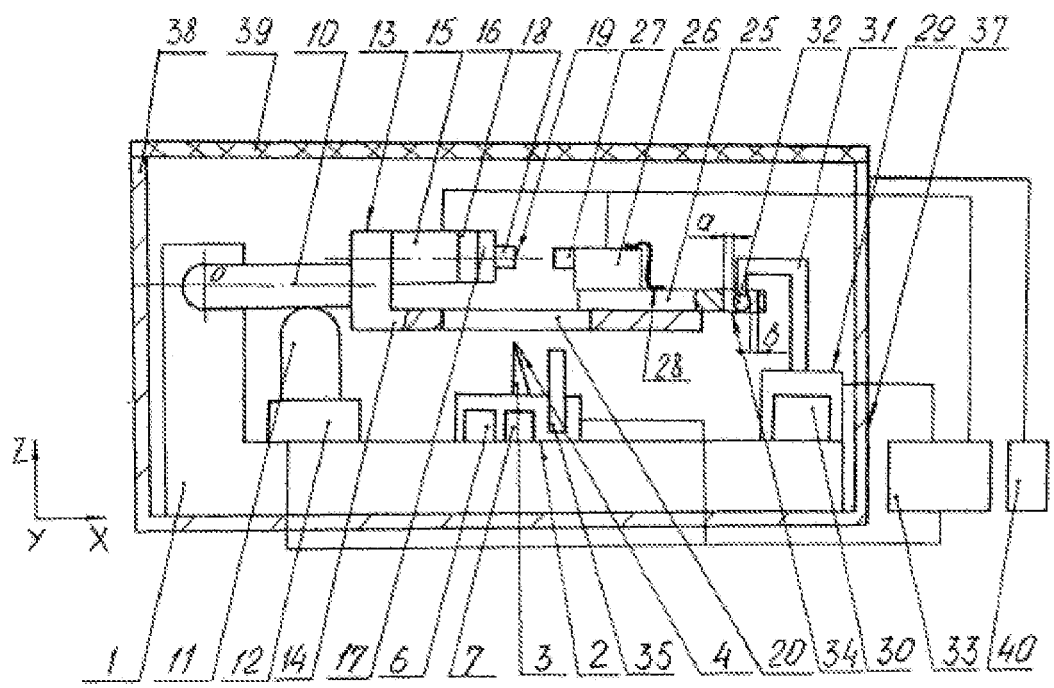
FIG. 1 shows an overview diagram of a scanning probe microscope combined with a device for acting on a probe and sample.

A scanning probe microscope (SPM) combined with a device for acting on a probe and sample comprises a base 1 (FIG. 1) having mounted thereon a punch module 2 with a punch 3 having a first cutting edge 4. In this case the punch module 2 includes a first drive 6, which provides for the movement of the punch 2 along a first coordinate X and a second drive 7, which provides for the movement of the punch 2 along a second coordinate Y. The first cutting edge 4 is disposed along a second coordinate Y.

A scanning probe microscope combined with a device for acting on a probe and sample also comprises a lever 10, which is mounted on a base 1 having the capability of movement in the direction of a third coordinate Z and is coupled to a pusher 11 of a third drive 12, which provides movement of the lever 10 along the third coordinate Z.

A scanning probe microscope combined with a device for acting on a probe and sample also comprises a measurement unit 13, which is secured on a lever 10 and consists of a set of structural elements. This set includes a platform 14, piezo scanner 15 with sample holder 16, on which a sample carrier 17 is mounted with a sample 18 having a sample surface to be measured 19 disposed over a slot 20 which is made in the platform 14. This set also includes a probe unit 25 with probe holder 26 in which the probe 27 is secured.

A first cutting edge 4 of the punch 3 directs its blade at a sample 18 in the direction of the third coordinate and is disposed with the capability of interacting with a sample 18 by its movement along the coordinate Z by the lever 10. The piezo scanner 15 is secured on the platform 14 and provides scanning of a sample 18 in the X, Y, Z coordinates; in this case the probe 27 has the capability of interacting with the measured surface 19 of the sample 18 during its scanning of the X, Y, Z coordinates. A probe unit 25 is mounted on a platform 14 and is coupled to a fourth drive 29 which provides movement of a probe unit 25 along a first coordinate X. In one of the variants the fourth drive 29 with propeller 30 is mounted on a base 1 and includes a lever 31 with ball stop 32. In this case the ball stop 32 is disposed in the slot 34 of the probe unit 25 with gaps a and b which are 1-2 mm each. The propeller can be a step motor ANGp 101 by the Attocube Co. A different disposition of the fourth drive 29 is also possible, for example on a platform 14 (not shown).

A mechanical action module 35 secured on a punch module 2 and having the capability of interacting with at least one of the elements of a set of structural elements of the measurement unit 13 is incorporated as an independent feature in the scanning probe microscope combined with a device for acting on a probe and sample. This raises the resolution of the device and the quality of the image, and also increases the functional capabilities of the device by studying a broader range of samples. The punch module 2 with first drive 6 and second drive 7, third drive 12, piezo scanner 15, probe unit 25, and fourth drive 29 is connected to a control unit 33. The base 1 along with elements disposed on it can be mounted in a cryo chamber 37, which consists of a housing 38 and cover 39, the cryo chamber 37 being connected to a refrigerant source 40. With this configuration, the fourth drive 29 can be disposed outside the cryo chamber 37 and can penetrate into the cryo chamber 37 through an opening in the cover 39 for interaction with the probe unit 25 (this variant also is not shown).

Elements 1, 2, 4, 10, 11, 12, 14, 38, 39, and 40 are standard components of microcryotomy. Elements 13, 15, 16, 17, 18, 21, 25, 26, 27, 29, and 30 are standard components of a scanning probe microscope.

The operation of a scanning probe microscope combined with a device for acting on a probe and sample is implemented as follows. A sample carrier 17 *c* with sample 18 is secured on a sample holder 16. A probe holder 26 with probe 27 is secured on a probe unit 25. Using a third drive 12, the measurement unit 13 is lowered in the direction of coordinate Z toward the punch 3 and the object 18 is cut, forming a surface 19 to be measured. After this the measurement unit 13 is raised by the third drive to the top position. Using the fourth drive 29, the probe 27 is drawn close to the surface 19 to be measured of the object 18. Then, using a piezo scanner 15, the surface 19 to be measured is scanned relative to the probe 27, and the topography of the surface 19 to be measured is measured. In this case, in different design variants prior to the cut, after the cut, or after measurement, one or more structural elements of the measurement unit 13 are acted on using a mechanical action module 35.

In one of the variants the mechanical action module 35 is mounted with the capability of interacting with the platform 14. Before measurement of the surface 19, using the movement of the measurement unit 13 along the coordinate Z, it can rest on the mechanical action module 35. In this case the measurement unit 13 acquires greater stability, which leads to a reduction in non-functional movements between the probe 27 and sample 18 in the measurement process. This raises the resolution of the device and the quality of the image, and also increases the functional capabilities of the device due to studying a wider range of samples.

In one of the variants the mechanical action module 35 is mounted with the capability of interacting with the probe 27. All the probes of scanning probe microscopes have sharp ends on which foreign contaminants (particles) may settle. These particles can be removed from the sharp end by the mechanical action module coming in contact with them. This raises the resolution of the device and the quality of the image, and also increases the functional capabilities of the device due to studying a broader range of samples.

In one of the variants the probe holder 26 is mounted with the capability of moving relative to the probe unit 25, and the mechanical action module 35 is mounted with the capability of interacting with and moving the probe holder 26. The probe holder 26 in most cases is a flat body in which a probe 27 is secured. This flat body can be pressed against the probe unit 25 by a flat spring 28, permitting movement of the probe holder 26 along the coordinates X and Y. Coming in contact with the mechanical action module 35 through the slot 20 of the probe holder 26, it can be moved in the coordinates X and Y. It should be kept in mind that to execute this operation, the pharmacokinetic behavior 2 has to be shifted along the coordinate Y in such a way that the mechanical action module 35 ends up under the probe holder 26. In this case, it is necessary move the punch 3 out from under the sample 18 so as to preclude inadvertent contact of the punch 3 and sample 18 during further manipulations. After this, using the third drive 12, the lever 12 is lowered in the coordinate Z to the zone of possible contact of the mechanical action module 35 and the probe holder 26. Then the mechanical action module 35 and the probe holder 26 touch, and it is moved along the coordinates X, Y. It should also be kept in mind that if it is necessary to move the probe holder 26 in the X coordinate, the gap has to be eliminated using the fourth drive 29. This makes possible, during movement of the probe holder 26, to keep from moving the probe unit 25 in the coordinate X. Movement of the probe holder 26 in the coordinate Y usually does not require additional manipulations, since the probe unit 25 usually has single-coordinate movement in the coordinate X, for example using a V-shaped groove (not shown), which prohibits movement of the probe unit 25 in the coordinate Y. The capability of movement of the probe holder 26 in the coordinates X, Y makes it possible to change the position of the probe 27 relative to the measurement zone on the surface 19 to be measured. This widens the functional capabilities of the device.

In one of the variants the mechanical action module 35 is mounted with the capability of interacting with and moving the probe unit 25. The capability of mechanical contact of the map* 35 and the probe unit 25 is provided by analogous operations which are described in the preceding paragraph. It is most helpful to use movement of the probe unit 25 when withdrawing the probe 27 from the sample 18 after competing measurement of the surface 19. The fourth drive is the main drive for this, by selecting the gap b and removing the probe unit 25 along with the probe 27 from the measurement surface 19.

But considering that the distance between the probe 27 and the surface 19 to be measured can be less than one micron, quite frequently at the starting moment of removal, non-functional touching of the probe 27 and the surface 19 to be measured occurs. As a result, the probe 27 can malfunction or worsen its characteristics due to loss of its sharpness. So as to reduce the likelihood of such touching, it is possible to simultaneously start removal of the probe 27 from the surface 19 to be measured both with the fourth drive 29 and the mechanical action module 35. Thus preservers the sharpness of the probe 27 for a longer time, raises the resolution of the device and the quality of the image, and also increases the functional capabilities of the device due to studying a wider range of samples.

In one of the variants the mechanical action module 35 is mounted with the capability of interacting with the sample 18. In this case it is possible to remove foreign contaminants from the sample, which raises resolution of the device and quality of the image and also increases the functional capabilities of the device due to studying a broader range of samples.

In one of the variants the sample carrier 17 is mounted with the capability of moving relative to the sample holder 16, and the mechanical action module 35 is mounted with the capability of interacting with and moving the sample carrier 17. In this case the sample holder 16 can be made of magnetic alloy SmCo and the sample carrier 17 of nickel.

Movement of the sample carrier 17 along the third coordinate Z can be implemented using the third drive 12. Movement of the sample carrier 17 along a second coordinate Y can be implemented using the second drive 7. Movement of the sample carrier 17 along the coordinates Y, Z makes it possible to change the position of the probe 27 relative to the zone of measurement on the surface 19 to be measured. This broadens the functional capabilities of the device. At the same time the fact that the sample carrier 17 can have movement in the coordinate Z ensures preservation of the piezo scanner 15 from breakage if for example the force of cutting the sample 18 exceeds the strength of the piezo scanner along the Z coordinate. For this it is necessary for the selected force of magnetic compression on the coordinate Z to be no more than five times less than the force of probable breakage of the piezo scanner 15.

In one of the variants the mechanical action module 35 includes a heating unit 42. The heating unit 42 can be an Atos microheater or a miniature Peltier element. When the mechanical action module 35 touches the probe 27 and the probe 18, heating them to a temperature in the range of from −40 to +110° C., it is possible to evaporate moisture and frost from them before the measurement process, which raises the resolution of the device and the quality of the image, and also increases the functional capabilities of the device due to studying a broader range of samples.

In one of the variants the mechanical action module 35 includes a piezo module 45. The piezo module 45 can use a piezoceramic plate 45 with electrodes connected to a control unit 33 (now shown). When the mechanical action module 35 touches the probe 27 and sample 18, using mechanical oscillations it is possible to remove contaminants from them without deforming the blade of the probe 27 and the working zone of the surface 19 to be measured before the measurement process, which raises the resolution of the device and quality of the image. The frequency of the mechanical oscillations can be in a range of 1-100 kHz, and the amplitude in a range of 10-1000 nm.

In one of the variants the mechanical action module includes a second cutting edge 50, disposed along the second coordinate Y and directing its point at surface 19 to be measured of the sample 18 in the direction of the first coordinate X. Using the second cutting edge 50 (FIG. 2, FIG. 3) it is possible to cut the surface 19 to be measured along the coordinate Y. In this case the sample along the coordinate Z has to be brought close to the second cutting edge 50, and using the probe unit 50, it is necessary to go deeper into the into the sample using the second cutting edge 50 along the coordinate X. After this it is necessary to return the punch 3 along the coordinate Y to the working position and cut the sample 18 to a cut along the Y coordinate made with the second cutting edge 50. Then it is possible to take measurements with the probe 27 of the step zone of the surface 19 to be measured, and within the framework of a single scan, to compare the two cut surfaces. The height of the step must not exceed the range of movement of the piezo scanner 15 along the coordinate X. It can be around 1 mcm. This expands the functional capabilities of the device.

In one of the variants the mechanical action module 35 includes a needle which is disposed along the first coordinate X and directs its point 56 at the surface 19 to be measured of the sample 18 along the direction of the first coordinate X. The tip 26 of the needle 55 can be used to make perforations in the sample 18 by analogy with creation of a cut along the coordinate Y described in the preceding paragraph. These perforations can serve as reference marks in each subsequent measurement of the surface 19 after the cut. A perforation depth of 10 mcm can ensure coordinate referencing for 500 measurements with minimal thickness of the cut of 20 nm, which is provided by standard microtomies. This widens the functional capabilities of the device and also increases the functional capabilities of the device due to studying of a wider range of samples.

In one of the variants a gas action module 60, mounted on a punch module 2, is incorporated in the scanning probe microscope combined with a device for acting on a probe and sample. The gas action module 60 includes a nozzle 36 which is combined with a gas unit 70. Incorporation of the gas action module 60 makes it possible, when using the chamber 37, to for an inert gas atmosphere in it, for example argon, which reduces the formation of frost on the probe 27 and the surface 19 to be measured during measurements at low temperatures. This raises the resolution of the device and the quality of the image, and also increases the functional capabilities of the device due to studying a wider range of samples.

For the capability of coupling a gas action module 60 to different objects, the nozzle 63 can be secured in the cylinder 64 with the capability of friction rotation in the stand 65, which in turn can be mounted with the capability of friction rotation in the module 67. In the simplest case, friction rotations can be implemented manually in one of the friction positions until the start of cutting of the sample 18 and measurement of the surface 19 with the probe 77. In another variant, in the capacity of the stand 65 and module 67, it is possible to use drives that provide rotations of actuating elements. For example, M42SP-6NK of the MITSUMI ELECTRONIC CO. Ltd. or ANR51 of the Attocube Co.

Figure 2:
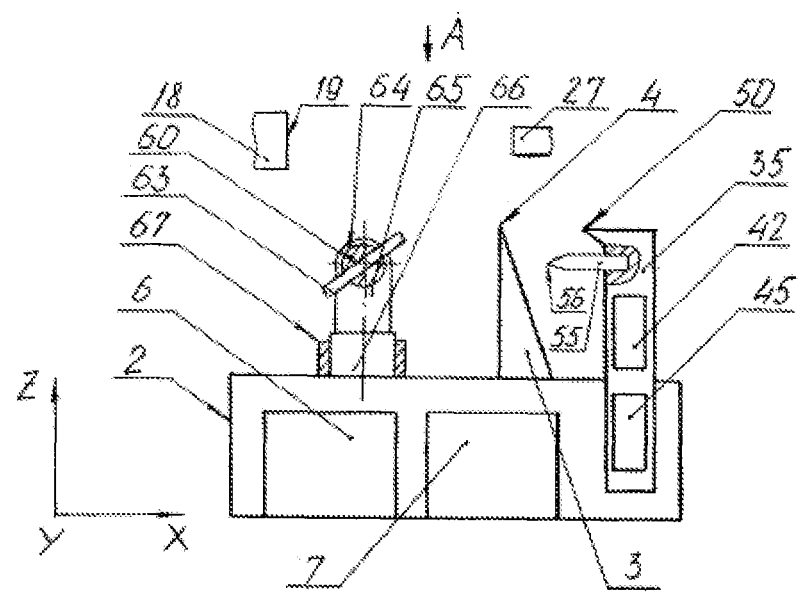
FIG. 2 and FIG. 3 show a front projection and side view of a mechanical action module coupled to a gas action module.
Figure 3:
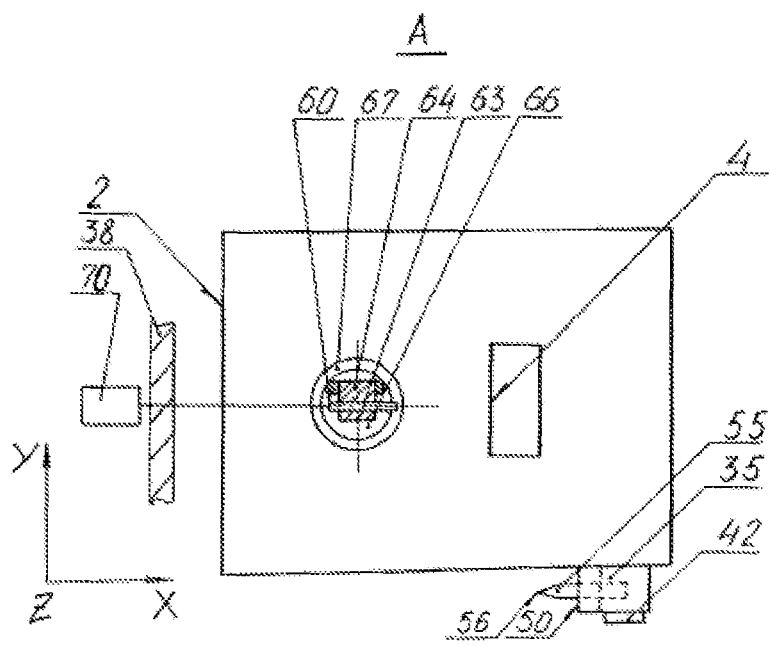

In one of the variants the gas action module 60 has the capability of coupling to the probe 27. When the nozzle 63 is coupled to the probe 27 (as shown in FIG. 2), it is possible to remove foreign contaminants from it, which raises the resolution of the device and the quality of the image, and also increases the functional capabilities of the device due to studying a broader range of samples.

In one of the variants the gas action module 60 has the capability of coupling to the first cutting edge 4 of the punch 3. When the nozzle 63 is coupled to the first cutting edge 4 of the punch 3, it is possible to remove foreign contaminants from it, which raises the resolution of the device and the quality of the image, and also increases the functional capabilities of the device due to studying a broader range of samples.

In one of the variants the gas action module 60 has the capability of coupling to the second cutting edge 50 of the mechanical action module 35. When the nozzle 63 is coupled to the second cutting edge 50 of the mechanical action module 35, foreign contaminants can be removed from it, which improves the measurement conditions of the stepped surface 19 to be measured, raises the resolution of the device and the quality of them image, and also increases the functional capabilities of the device due to studying a wider range of samples.

In one of the variants the gas action module 60 has the capability of coupling to the tip 56 of the needle 55. In this case the quality of perforations and the accuracy of coordinate referencing of successive measurements (after cutting) are improved. This widens the functional capabilities of the device, and also increases the functional capabilities due to studying a wider range of samples.

Figure 6:
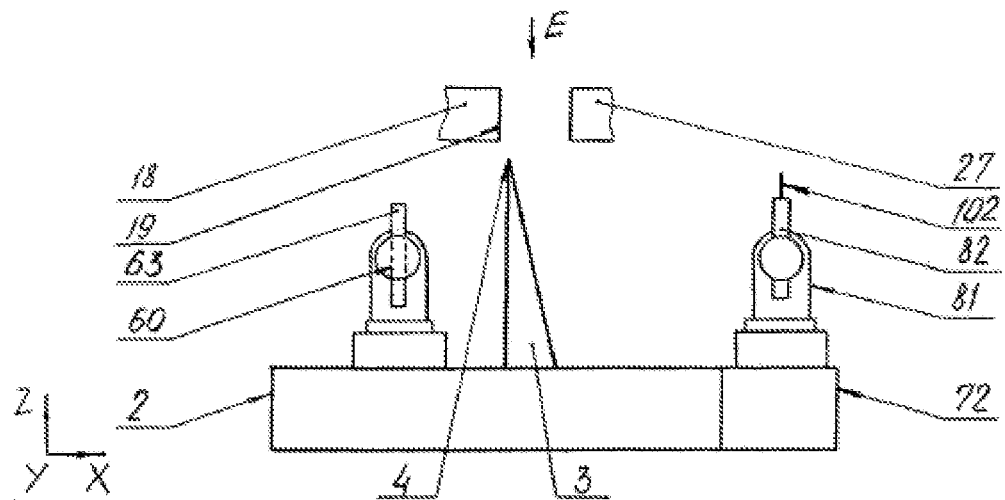
FIG. 6 and FIG. 7 show a front projection and top view of a mechanical action module coupled to gas, laser, ultraviolet, and plasma action modules in the case of their orientation in the direction of a probe and sample.
Figure 7:
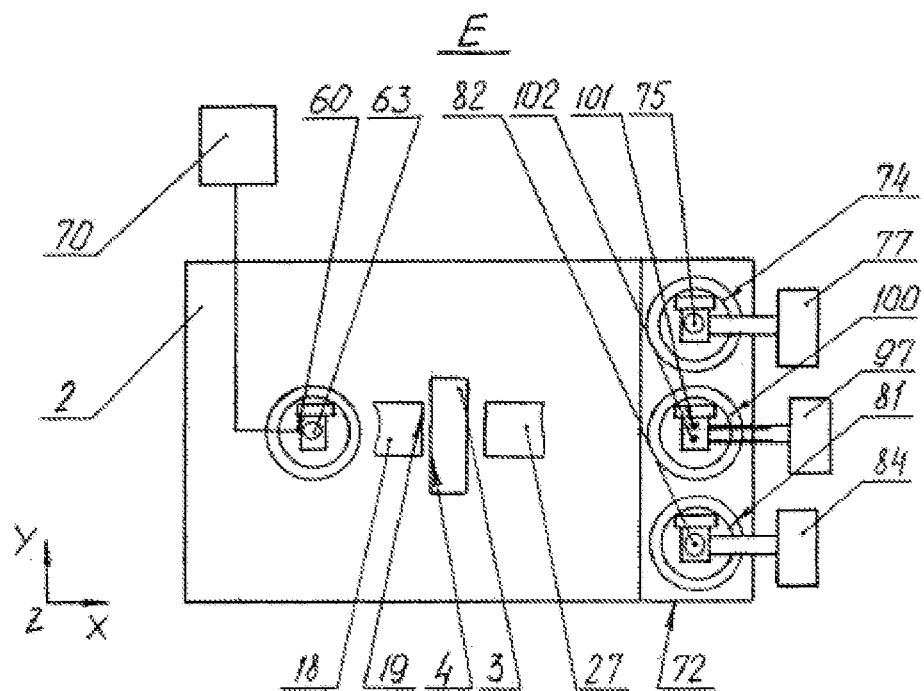

In one of the variants the gas action module 60 has the capability of coupling to the surface 19 to be measured of the sample 18. In this case the nozzle 63 can be disposed vertically, as shown in FIG. 6 and FIG. 7. In this case, by moving the punch module along the coordinates X, Y, and aligning the gas stream with the surface 19 to be measured, it is possible to remove foreign contaminants from it, which raises the resolution of the device and the quality of the image, and also increases the functional capabilities of the device due to studying a broader range of samples.

Figure 5:
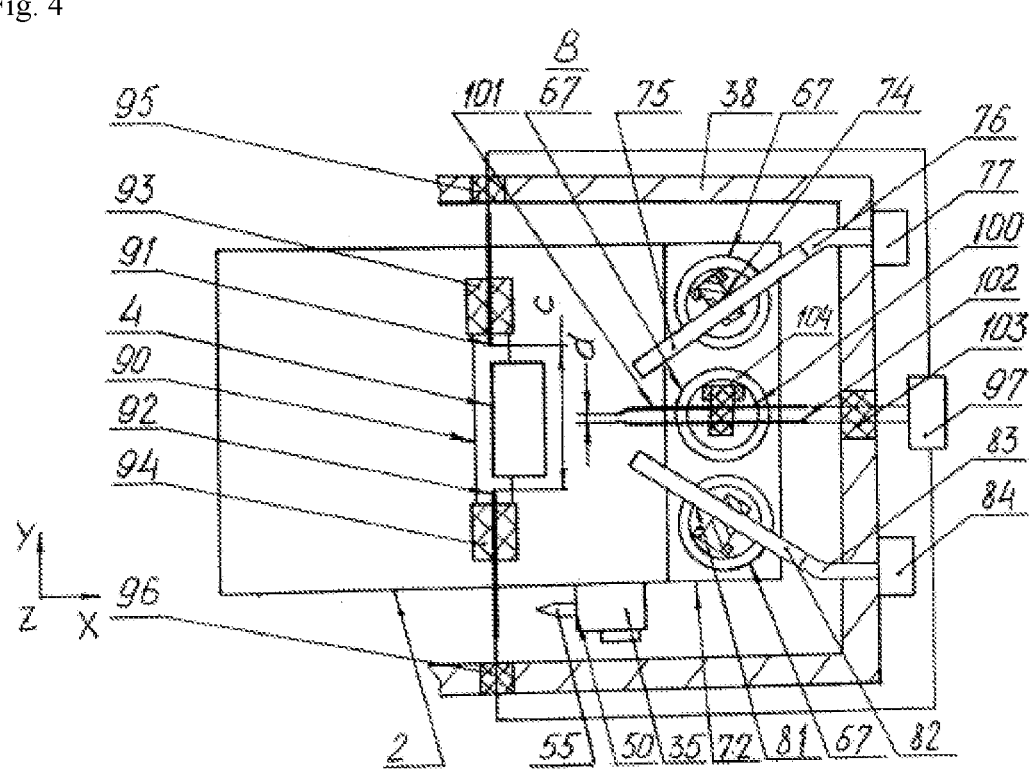

In one of the variants a laser action module 74 (FIG. 5), mounted on a punch module 2 and including a first radiator 75 coupled to a first LED 76 connected to a laser 77, can be incorporated in the device. The laser can be a Melles Griot 56-CRN laser with a wavelength of 515 nm and power of up to 60 mW.

In one of the variants the laser action module 74 has the capability of coupling to the first cutting edge 4 of the punchy 3. When the first radiator 75 is coupled with the first cutting edge 4 of the punch 3, it is possible to remove moisture and frost from it, which raises the quality of the cut, the resolution of the device, and the quality of the image, and also increases the functional capabilities of the device due to studying a wider range of samples.

In one of the variants the laser action module 74 has the capability of coupling to the second cutting edge 50 of the mechanical action module 35. When the first radiator 75 is coupled to the second cutting edge 50 of the mechanical action module 35, moisture and frost can be removed from it, which improves the measurement conditions of the stepped surface 19 to be measured, raises the resolution of the device and the quality of the image, and also increases the functional capabilities of the device by studying a wider range of samples.

In one of the variants the laser action module 74 has the capability of coupling to the tip 56 of the needle 55. In this case, frost and moisture can be removed from the tip 56, which improves the quality of the perforations and the accuracy of coordinate referencing of successive measurements (after cuts). This widens the functional capabilities of the device, and also increases the functional capabilities of the device by studying a wider range of samples.

In one of the variants the laser action module 74 has the capability of coupling to the surface 19 to be measured of the sample 18. In this case the first radiator 75 can be disposed vertically, as shown in FIG. 6 and FIG. 7. Here by moving the punch module 2 along the coordinates X, Y and aligning the laser radiation with the measurement surface 19, the frost and dust can be removed from it, which raises the resolution of the device and the quality of the image, and also increases the functional capabilities of the device due to studying a broader range of samples.

In one of the variants the laser action module 74 has the capability of coupling to the probe 27. In this case the first radiator 75 can be disposed vertically as shown in FIG. 6 and FIG. 7. Here by moving the punch module 2 along the coordinates X, Y and aligning the laser radiation with the probe 27, the frost and moisture can be removed from it, which raises the resolution of the device and the quality of the image, and also increases the functional capabilities of the device due to studying a wider range of samples.

In one of the variants an ultraviolet action module 81 (FIG. 4, FIG. 5), mounted on a punch module 2 and including a second radiator 82 coupled to a second fiber-optic waveguide 83, which is connected to an ultraviolet laser 84, is incorporated in the device. The ultraviolet laser can be a Coherent ExciStar XS 200 laser with a wavelength of 248 nm and power of up to 1.6 W.

In one of the variants the ultraviolet action module 81 has the capability of coupling to the first cutting edge 4 of the punch 3. When the second radiator 82 is coupled to the first cutting edge 4 of the punch 3, biological micro-objects can be removed from it, which raises the quality of the cut, the resolution of the device and the quality of the image.

In one of the variants, the ultraviolet action module 81 has the capability of coupling to the second cutting edge 50 of the mechanical action module 35. When the second radiator 82 is coupled to the second cutting edge 50 of the mechanical action module 35, biological micro-objects can be removed from it, which raises the quality of the cut along the coordinate Y, improves the measurement conditions of the stepped surface 19 to be measured, raises the resolution of the device and the quality of the image, and also increases the functional capabilities of the device by studying a wider range of samples.

In one of the variants the ultraviolet action module 81 has the capability of coupling to the tip 56 of the needle 55. In this case, biological micro-objects can be removed from the tip 56, which improves the quality of perforations and accuracy of coordinate referencing of successive measurements (after cuts). This widens the functional capabilities of the device, and also increases the functional capabilities of the device by studying a wider range of samples.

In one of the variants the ultraviolet action module 81 has the capability of coupling to the surface 19 to be measured of the sample 18. In this case the second radiator 82 can be disposed vertically, as shown in FIG. 6 and FIG. 7. Here by moving the punch module 2 and aligning the ultraviolet radiation with the measurement surface 19, biological micro-objects can be removed from it, or changes can be made in biological structures on the surface 19, for example a change in the protein structure of the collagen protein and the mechanical properties and structural organization of collagen fibrils as a result of cross linking of protein molecules which raises the resolution of the device and the quality of the image, and also increases the functional capabilities of the device due to studying a broader range of samples.

In one of the variants the ultraviolet action module 81 has the capability of coupling to the probe 27. In this case the second radiator 82 can be disposed vertically, as shown in FIG. 6 and FIG. 7. Here by moving the punch module 2 along the coordinate X, Y and aligning the ultraviolet radiation with the probe 27, it is possible to remove biological micro-objects from it, which raises the resolution of the device and the quality of the image, and also increases the functional capabilities of the device due to studying a broader range of samples.

In one of the variants a first plasma action module (90) (FIG. 4, FIG. 5) mounted on a punch module 2 and having the capability of coupling to a first cutting edge 4 of the punch 3 is incorporated in the scanning probe microscope combined with a device for acting on a probe and sample. In this case the first plasma action module 90 includes a first electrode 91 and second electrode 92, secured respectively in a first insulator 93 and a second insulator 94 along the same line along the coordinate Y, and connected by a plasma forming module 97. The distance between the first electrode 91 and second electrode 92 can be 3-7 mm, the voltage between them in the ignition mode can be 1-15 kV for a duration of 0.01-100 microseconds. The burner voltage of plasma discharge is 20-100 V. Argon can be used as the plasma-forming gas. The plasma between the first electrode 91 and second electrode 92 makes it possible to clean the blade 4 of foreign organic contaminants, which raises the quality of the cut, the resolution of the device, and quality of the image, and also increases the functional capabilities of the device due studying a wider range of samples.

In one of the variants a second plasma action module 100 in the zone of the blade 4 of the punch 3 and mounted on the punch module 2, is incorporated in the scanning probe microscope combined with the device for acting on the probe and sample. In this case, the second plasma action module 100 includes a third electrode 101 and fourth electrode 102, which are secured respectively parallel to one another in the third insulator 104 and are connected to the plasma forming module 97. The distance d between the third electrode 101 and fourth electord3e 102 can be 0.1-2 mm, while the voltage between them in the ignition mode can be 100 V-10 kV for a duration of 0.01-100 microseconds. The combustion voltage of the plasma discharge is 10-100 V. Argon can be used as the plasma-forming gas. The plasma between the third electrode 101 and the fourth electrode 102 makes it possible to clean the blade 4 of organic foreign contaminants, which raises the quality of the cut, the resolution of the device, and the quality of the image, and also raises the functional capabilities of the device due to studying a wider range of samples.

Connecting wires between electrodes 91, 92, 101, 102 and the plasma forming module passing through the housing 38 can be disposed in viton seals 95, 96, 102.

Figure 4:
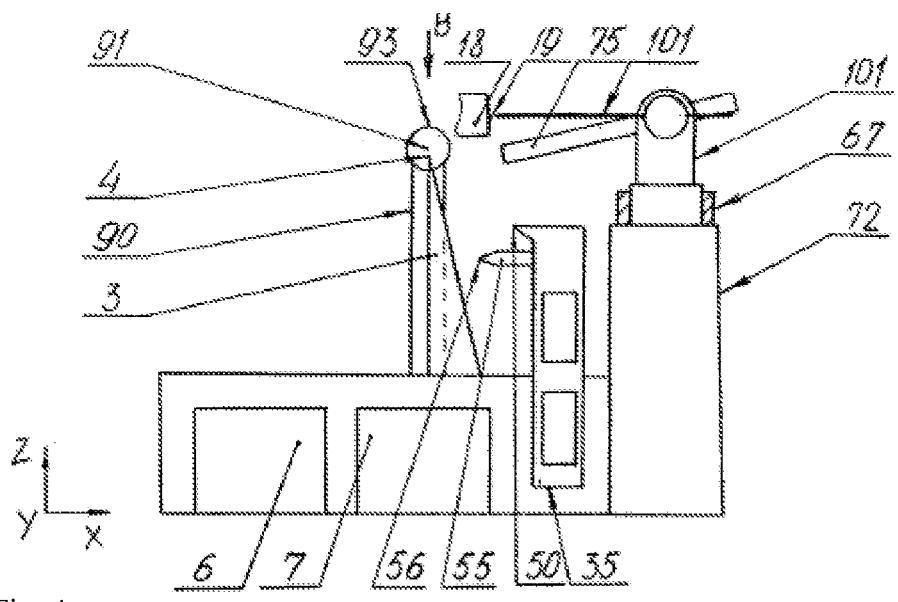
FIG. 4 and FIG. 5 show a front projection and top view of a mechanical action module coupled to laser, ultraviolet, and plasma action modules.

In one of the variants the second plasma action module 100 has the capability of coupling to the surface 19 to be measured of the sample 18. The plasma between the third electrode 101 and fourth electrode 102 makes it possible to clean the surface 19 to be measured (as shown in FIG. 4) of organic foreign contaminants or to perform plasma etching of the surface 19 on detection of extraneous inclusions, which raises the resolution of the device and the quality of the image, and also increases the functional capabilities of the device by studying a wider range of samples.

In one of the variants the second plasma action module 100 has the capability of coupling with the surface 19 to be measured of the sample 18. The plasma between the third electrode 101 and fourth electrode 102 makes it possible to clean the surface 19 to be measured (as shown in FIG. 4) of organic foreign contaminants or to perform plasma etching of the surface 19 on detection of extraneous inclusions, which raises the resolution of the device and the quality of the image, and also increases the functional capabilities of the device by studying a wider range of samples.

In one of the variants the plasma action module 100 has the capability of coupling to the second cutting edge 50 of the mechanical action module 35. This can be implemented during rotation of the third electrode 101 and fourth electrode 102 counterclockwise (FIG. 4). Plasma between the third electrode 101 and fourth electrode 102 makes it possible to clean the second cutting edge 50 of the mechanical action module 35 of organic foreign contaminants, which raises the resolution of the device and the quality of the image and also increases the functional capabilities of the device by studying a wider range of samples.

The invention claimed is:

1. A scanning probe microscope combined with a device for acting on a probe and sample, comprising a base having mounted thereon a punch module with a punch, comprising a first cutting edge, wherein the punch module comprises a first drive which provides for the movement of the punch along a first coordinate X and a second drive which provides for the movement of the punch along a second coordinate Y, and a first cutting edge is disposed along a second coordinate Y also comprising a lever mounted on the base with the capability of movement in the direction of the third coordinate Z and coupled to a pusher of the third drive which provides for movement of the lever along the third coordinate Z, also comprising a measurement unit which is secured on the lever and consists of a set of structural elements comprising a platform, a piezo scanner with sample holder on which is mounted a sample carrier with sample having a surface to be measured, also comprising a probe unit with probe holder in which a probe is secured, wherein the first cutting average of the punch directs its sharpened point at the sample in the direction of the third coordinate Z and is disposed with the capability of interacting with the sample by moving it along the coordinate Z with the lever, the piezo scanner being secured on the platform and providing for scanning of the sample in the X, Y, Z coordinates, a probe unit being mounted on the platform and coupled to the fourth drive, providing for movement of the probe unit along a first coordinate X, while the probe has the capability of interacting with the surface to be measured of the sample during scanning along the coordinates X, Y, Z, characterized in that a mechanical action module, secured on the punch module and having the capability of interacting with at least one element from the set of structural elements of the measurement unit is incorporated in it.

2. The device according to claim 1 characterized in that the mechanical action module is mounted with the capability of interacting with platform.

3. The device according to claim 1 characterized in that the mechanical action module is mounted with the capability of interacting with the probe.

4. The device according to claim 1 characterized in that the probe holder is mounted with the capability of sliding relative to the probe unit while the mechanical action module is mounted with the capability of interacting with and sliding the probe holder.

5. The device according to claim 1 characterized in that the mechanical action module is mounted with the capability of interacting with and sliding the probe unit.

6. The device according to claim 1 characterized in that the mechanical action module is mounted with the capability of interacting with the sample.

7. The device according to claim 1 characterized in that the sample carrier is mounted with the capability of sliding relative to the sample holder, while the mechanical action module is mounted with the capability of interacting with and sliding the sample carrier.

8. The device according to claim 1 characterized in that the mechanical action module comprises a heater unit.

9. The device according to claim 1, characterized in that the mechanical action module comprises a piezo module.

10. The device according to claim 1, characterized in that the mechanical action module includes a second cutting edge disposed along the second coordinate Y and directing its pointed end at the surface to be measured of the sample in the direction of the first coordinate X.

11. The device according to claim 1 characterized in that the mechanical action module comprises a needle disposed along the first coordinate X and directing its blade in the direction of the surface to be measured of the sample in the direction of the first coordinate X.

12. The device according to claim 1 characterized in that the fourth drive is mounted on the base.

13. The device according to claim 1 characterized in that the gas action module mounted on the punch module is incorporated in it.

14. The device according to claim 12 characterized in that the gas action module has the capability of coupling to the probe.

15. The device according to claim 12 characterized in that the gas action module has the capability of coupling to the first cutting edge of the punch.

16. The device according to claim 9, characterized in that the gas action module has the capability of coupling to the second cutting edge of the mechanical action module.

17. The device according to claim 10 characterized in that the gas action module has a capability of coupling to the point of the needle.

18. The device according to claim 12 characterized in that the gas action module has a capability of coupling to the surface to be measured of the sample.

19. The device according to claim 1 characterized in that a laser action module mounted on the punch module is incorporated in it.

20. The device according to claim 18 characterized in that the laser action module has the capability of coupling with the first cutting edge of the punch.

* * * * *